United States Patent Office 3,072,486
Patented Jan. 8, 1963

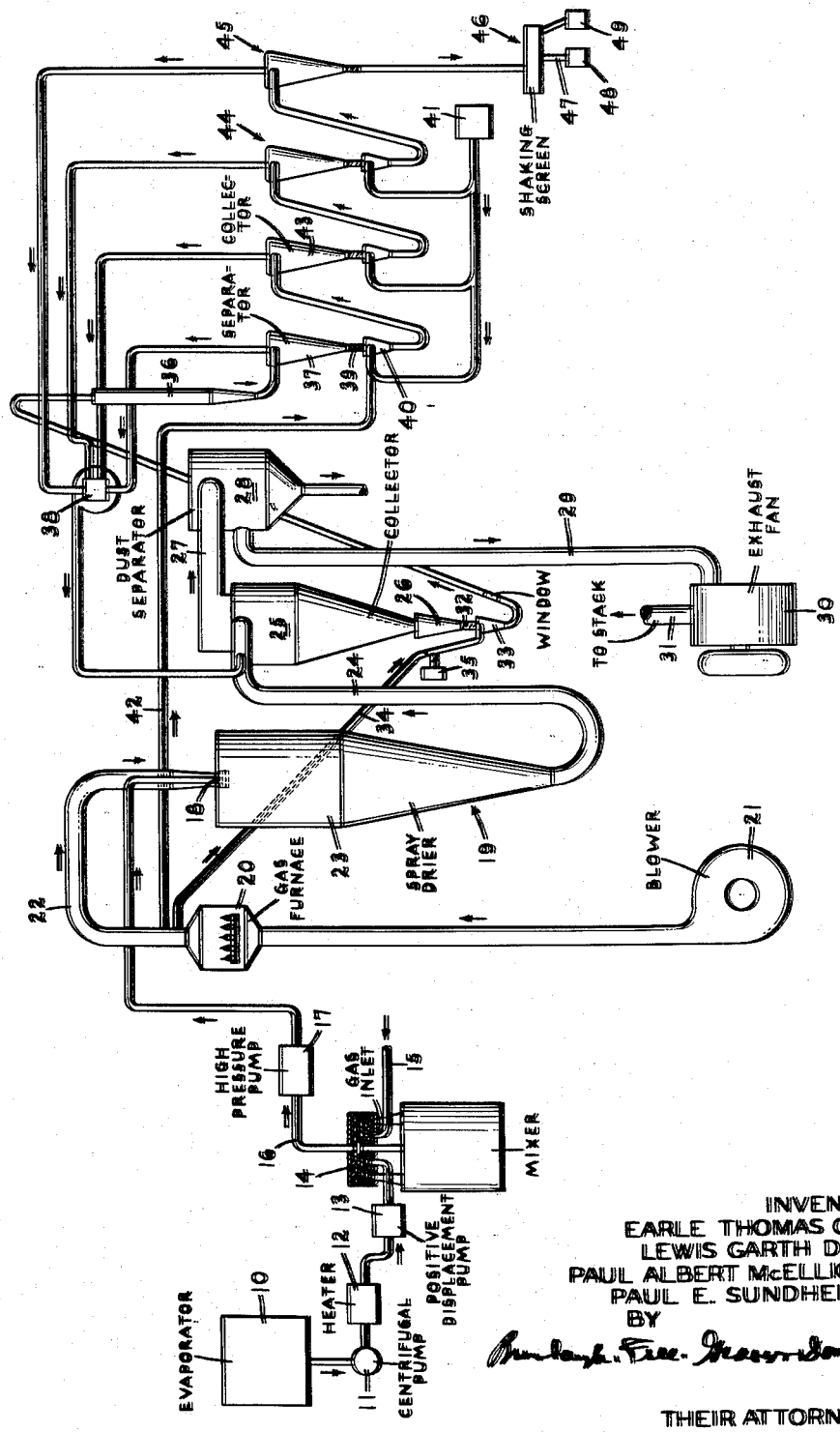

3,072,486
PREPARATION FOR SOLUBLE MILK POWDER
Earle Thomas Oakes, Islip, Lewis Garth Doom, East Islip, Paul Albert McElligott, Greenlawn, and Paul E. Sundheim, Bayport, N.Y., assignors to The E. T. Oakes Corporation, Islip, N.Y., a corporation of New York
Filed June 30, 1959, Ser. No. 824,116
7 Claims. (Cl. 99—56)

This invention relates to the preparation of dried milk products and it relates more particularly to methods of and systems for preparing instantly soluble skim milk and whole milk powders.

Instantly soluble or cold water soluble skim milk products have been made heretofore by pumping a partially dehydrated or concentrated skim milk at high pressure into a spray drier where the milk is broken up into finely divided particles which are quickly dried to powder form by contact with heated gas. The resulting product is then passed through a unit called an "instantizer" which converts the product to instant milk powder. Some spray-drying equipment produces a product composed partially of instant skim milk powder. The instant skim milk powder is separated from the smaller and less soluble particles by a screening operation. The finest particles which cannot be filtered out, are collected in an air separator and are used for stock feed or the like.

Instant skim milk powder brings a higher price on the market than the less soluble skim milk powder which is separated from it.

Preparation of instant skim milk by the above-described process is rendered difficult because there are a great many variables in the operation. The temperature of the drying medium in the spray drying tower must be controlled closely; otherwise heat damage and the production of "off" flavor in the products results. It has been discovered, for example, that the heat damage is most common when the moisture content in the product has been reduced to between about 20% and 5%. In order to keep heat damage to a minimum, it is necessary that the product pass through the range of 20% to 5% moisture content in the shortest possible period of time.

Another factor which must be controlled is the particle size of the product. Only about 40 to 50% of the dried milk product, made as described above, is of a type having a particle size and shape which renders it instantly soluble in water. These larger particles have a maximum size of up to 200 microns which gives a product having a bulk density of about 250 to 275 lbs. per barrel, i.e., a specific gravity of about 0.70. Generally a superior product has relatively large particles of uniform size and as low a bulk density as possible.

In accordance with the present invention, we have provided apparatus and a process whereby a greatly increased yield of an improved instant dried milk powder composed of particles of a large and highly soluble type are obtained.

More particularly, in accordance with the present invention, partially dehydrated or concentrated milk is supplied to a mixing apparatus wherein an inert gas such as, for example, nitrogen or a nitrogen-containing gas such as nitrous oxide is beaten into and mixed with the milk concentrate to form a stable foam or froth containing very finely divided gas bubbles. The foam or froth is pumped under superatmospheric pressure into the spray head of a spray drying apparatus and is sprayed into an atmosphere of heated gas where the particles of froth or foam discharged from the spray head are dried to a milk powder containing a very high percentage of instantly soluble milk particles. For example, in accordance with the present invention, skim milk products are obtained which contain up to 92% instant skim milk powder and the remainder ordinary skim milk powder. The marked increase in the ratio of instant soluble milk powder to ordinary milk powder is of extreme importance from the standpoint of manufacturing economics. The particles of the instant dried milk products produced in accordance with the invention have sizes up to 500 microns in diameter with many of the particles being as large as 800 to 1000 microns in diameter. The particles are of spongy or highly porous nature giving them a low bulk density and a specific gravity in the range of about 0.27 to 0.55. The large size and high porosity with correspondingly low bulk density also facilitates drying of the milk product with the result that heat damage and the development of "off" or burned flavor in the product is reduced to a minimum. In fact, experienced testers can detect little difference between fresh skim milk and reconstituted instant skim milk powder made in accordance with the present invention.

For a better understanding of the present invention reference may be had to the accompanying drawings in which the single FIGURE is a schematic illustration of a typical system for producing instant dried milk products in accordance with the present invention.

Referring to the drawing, a typical system includes a vacuum pan evaporator 10 by means of which liquid milk such as, for example, liquid skim or whole milk is concentrated to a moisture content of about 46% to 53%. A skim milk concentrate containing between about 47% and 51% solids (23.2° to 24° Baumé) is suitable. However, any concentrate that can be put through the mixer described hereinafter can be used. The higher the concentration the greater the production rate. The concentrate is withdrawn from the evaporator by means of centrifugal pump 11 and is supplied to a heater 12 where the concentrate is heated to between about 105° F. and 120° F. The heated milk is then supplied to a positive displacement pump 13 and is passed into a mixer 14 for formation into a foam or froth therein. A highly satisfactory mixer for frothing or foaming the milk concentrate is shown in the E. T. Oakes U.S. Patent No. 2,572,049, granted October 23, 1951. This mixer includes a rotor provided with concentric annular rows of teeth and a pair of stators on opposite sides of the rotor also having annular rows of teeth interposed between the rows of rotor teeth so that the product flowing between the rotor and stators is caused to follow a tortuous path while being subjected to a whipping and beating action. Inert or non-oxidizing gas, such as nitrogen or other harmless gas such as nitrous oxide, is introduced under superatmospheric pressure into the mixer 14 through a suitable gas inlet connection 15 which may be provided with pressure-regulating and flow rate valves (not shown) for regulating the pressure of the gas as well as the rate at which the gas is introduced into the mixer 14. A stable foam or froth is formed by the mixer 14 and flows through a conduit 16 into a pump 17 such as a Manton Gaulin reciprocating piston pump for supplying the foam under superatmospheric pressure to the spray head 18 of a spray drier 19. The pump 17 is provided with a bypass, and return and pressure regulating valves (not shown) in order to provide for regulation of the pressure at which foam or froth is supplied to the spray head 18.

Heated gases for drying the foam product are supplied by means of one or more direct fired gas furnaces 20 which are supplied with air by means of a blower 21 driven, for example, by means of an electric motor or a steam turbine. Heated gas from the furnace 20 flows through a duct 22 into the top of the spray drying chamber 23 and into intimate contact with the particles or droplets of the foam material which are discharged from the spray head 18. As the particles fall downwardly in the chamber 23 in contact with the heated gases, they are entrained and carried by means of the gas through a duct 24 into a primary collector 25 of the cyclone separator type. The larger particles are discharged downwardly into the collection chamber 26 at the bottom of the separator while the fines are discharged overhead through the duct 27 into a bag type of dust collector 28. The fines are removed from the system and may be used as stock feed or for similar purposes. The gas from the bag type dust collector 28 is discharged downwardly through the duct 29 by means of an exhaust fan 30 which directs the exhaust gases through the duct 31 to the stack.

Larger particles collected in the collector chamber 26 are discharged downwardly through a trap valve system 32 into a discharge chamber 33 where heated gases admitted through the downcomer 34 and air admitted through an air filter 35 are used to convey the particles to a secondary drier 36 or redrier. The redried material is then discharged from the bottom of the redrier 36 into an air separator 37, the air being returned to a booster blower 38 from which it is discharged into the duct 24. The solids collected in the air separator 37 are discharged downwardly through the valves 39 into the collector 40 and are conveyed by means of air supplied from the air filter 41 and gases supplied through the conduit 42 from the gas furnace to another air separator and collector 43. In a similar way, the powder collected in the air separator 43 may be passed through successive separators 44 and 45, the powder being discharged from the latter separator to a shaker 46 where instant powder is discharged through the pipe 47 into a collector 48 and the regular milk powder is discharged into another collector 49.

It will be understood that the arrangement of the separators and the air flow ducts in the system may be modified considerably and one or more of the air separators 37, 43, 44 and 45 can be omitted if desired.

In a typical operation, the following conditions were present:

EXAMPLE 1

The rotor of the mixer 14 was operated at 425 r.p.m. and the milk concentrate having a solids content of 47½% was supplied to the mixer by means of the pump 13 at a pressure of 100 lbs. per square inch. Nitrous oxide was introduced through the inlet 15 of the mixer at 150 lbs. p.s.i. gauge and at a rate of .6 cubic foot per minute. The temperature of the milk entering the pump 13 was 110°. The foam produced by the mixer was pumped by the pump 17 at a pressure of 1500 lbs. per square inch into the spray head 18 of the spray drier. Air was admitted into the spray drier from the furnace 20 at a temperature of 450° F. The air leaving the spray drier had a temperature between 180° and 183°. The product resulting from this spray drying operation had a moisture content of 1.5% and produced at the rate of 1464 lbs. of instant product and 117 lbs. of non-instant product per hour. The bulk density of this product was approximately 125 lbs. per barrel (a specific gravity of about 0.38). When the resulting instant powder was reconstituted into skim milk, the taste was excellent and very little difference could be told between the reconstituted product and fresh skim milk. Due to the lightness of the powder it floated rather than sank as is customary with the prior instant milk products but nevertheless dissolved almost instantly in cold water. The product under 100 power microscope was very spongy in apperance having a multitude of very fine bubbles distributed throughout the particles. The particles ranged in size up to about 500 microns maximum dimension.

The following table discloses another series of examples of the process. The elements referred to in the left-hand column are identified by the reference character to which they correspond in the figure of the drawing.

*Table I*

|  | A | B | C | D | E | F | G |
|---|---|---|---|---|---|---|---|
| Rotor 14, r.p.m | 550 | 500 | 500 | 500 | 500 | 500 | 500 |
| Pump 13, p.s.i | 350 | 375 | 400 | 420 | 430 | 350 | 310 |
| Nitrogen, p.s.i., 15 | 150 | 150 | 150 | 150 | 150 | 150 | 150 |
| Nitrogen, c.f.m., 15 | .50 | .40 | .30 | .30 | .20 | .35 | .31 |
| Back Press | 100 | 100 | 100 | 105 | 95 | 100 | 100 |
| Temp. Out, degrees | 112 | 112 | 112 | 112 | 112 | 116 | 116 |
| Baumé | 23.8 | 23.8 | 23.8 | 23.2 | 23.4 | 23.2 | 23.8 |
| Percent Solids | 48.5 | 48.5 | 48.5 | 47.2 | 47.7 | 47.2 | 48.5 |
| MG pump 17 Press | ¹1,100 | ¹1,200 | ¹1,300 | ¹1,400 | ²1,300 | 1,000 | 900 |
| In Air Temp., degrees | 405 | 400 | 410 | 425 | 425 | 405 | 376 |
| Out Air Temp., degrees | 196 | 194 | 185 | 185 | 185 | 183 | 183 |

¹ No by passing on MG pump.  ² By passing on MG pump.

In each of the examples, the product dried readily and flowed through the spray drier and separators without building up in or clogging the apparatus.

Products produced in accordance with the Examples B, C, D and E had specific gravities respectively of .38, .40, .42, and .43. The product produced by example D had a weight per barrel of 173 lbs. of which 147 lbs. was instant skim milk powder and 20.5 lbs. was regular skim milk powder. Thus, the ratio of instant to regular skimmed milk powder produced was 88.12.

The products made in accordance with Examples A to E, in which nitrogen was used, were of more uniform particle size than the products made with nitrous oxide inasmuch as nitrogen is less soluble than nitrous oxide in milk.

In example F, 81% instant and 19% non-instant skim milk powder were produced. In Example G, 79% instant and 21% non-instant skim milk powder were produced.

The product produced in accordance with Example F, contained particles approximately 600 microns in length and 400 microns in thickness and width. In general, particles in the range of approximately 350 to 400 microns and less were fairly regular in shape and generally round. The larger particles were somewhat less regular in shape and usually more oval. Skim milk particles produced by Example G contained occasional particles as large as 1000 microns in length by 700 to 800 microns across. Most of the particles were less than 750 microns by 500 microns. The lower spraying drying pressure probably resulted in an increase in particle size.

In order to determine the characteristics of the foam produced by aeration of the milk concentrate with inert gas, tests were conducted in which the foam materials produced in the mixer were discharged through a restricted passage into a receiver. The restricted passage provided a back pressure in the system to prevent "blow by" of the gas during mixing.

It was found that variation of the feed rate of nitrogen or nitrous oxide to the mixer and the pressure in the system and the speed of the mixer rotor produced stable foams of varying consistency. These foams varied from the consistency of a heavy cream to stiff whipped cream. In each case the foam had sufficient body that the gas therein had little or no tendency to escape over a substantial period of time. The foam product varied in weight at atmospheric pressure from a minimum of about 18 lbs. per 10 gals. to a maximum of about 75 lbs. per 10 gals. depending upon the mixing speed and the rate of flow of the material therethrough. Thus, with mixer rotor speeds on the order of 600 r.p.m. and a nitrogen feed of .60 cubic foot per minute, the product was extremely stiff and almost like whipped cream in ability to hold its shape.

When a skim milk concentrate was admitted to the mixer 14 at a pressure of 100 p.s.i.g., nitrous oxide was supplied at 150 lbs. pressure and at a rate of .7 cubic foot per minute, and the mixer rotor was driven at 425 r.p.m., the foam was somewhat thicker than heavy cream and had a weight of 32 lbs. per 10 gal. can.

In other tests conducted with whole milk, under operating conditions like those set forth in Examples F and G, a product was obtained of large and relatively uniform particle size which was quickly soluble in water.

Dried milk products produced in accordance with the present invention, when reconstituted, have a flavor practically indistinguishable from the corresponding fresh milk product thereby indicating a minimum of heat damage to the particles in the critical range of moisture content.

Moreover, the product has a larger particle size which can be produced without sticking in the drier and which can be dried to a lower moisture content in the range of 1½% to 2½% moisture. The product also has a very light bulk density and, in fact, much lighter than the products produced heretofore.

Of particular importance is that the dried product contains a much higher proportion of instant to regular milk powder so that subsequent treatments to render the regular powder quickly soluble can be eliminated.

The more efficient drying of the particles has the advantage enabling the air inlet and air outlet temperatures in the spray drier to be such that there is a substantial saving in the fuel costs. Also, it follows that the production rate of the drier is increased by its more efficient operation and the products having a higher milk concentration can be dried therein with a further saving in production costs.

It will be understood that the apparatus or system embodying the present invention is susceptible to modification as indicated above in the arrangement of the pumps, the gas and air feeds, operating pressures, concentration of the milk concentrates, and in the drying and separating stages therein. Accordingly, the form of the invention described herein should be considered as illustrative and not as limiting the scope of the following claims.

We claim:

1. A method of producing water soluble milk products comprising concentrating a liquid milk product, introducing an inert gas into the concentrated milk, beating and whipping said concentrated milk and gas at superatmospheric pressure to form a stable foam having a consistency between that of heavy cream and stiff whipped cream, pumping the foam under superatmospheric pressure and spraying it into an atmosphere of heated gas to form dried porous particles of milk solid having a specific gravity between about 0.27 and 0.55.

2. The method set forth in claim 1 in which the liquid milk product is skim milk.

3. The method set forth in claim 1 in which said liquid milk product is whole milk.

4. The method set forth in claim 1 in which said foam has a density between about 18 lbs. and 75 lbs. per 10 gals. at atmospheric pressure.

5. A method of producing water soluble milk products comprising concentrating a liquid milk product to a moisture content between about 46% and 53%, heating the concentrated liquid milk product to between about 105° F. and 120° F., introducing an inert gas into the concentrated milk, whipping and beating said milk and gas at superatmospheric pressure to form a stable foam having a density of about 18 to 75 lbs. per 10 gals. at atmospheric pressure, pumping the foam under high pressure and spraying it into an atmosphere of heated gas to form dried porous particles of milk solid having a specific gravity between about 0.38 and 0.55.

6. A method of producing water soluble milk products comprising concentrating a liquid milk product to a moisture content between about 46% and 53%, introducing an inert gas into the concentrated milk, whipping and beating said milk and gas at superatmospheric pressure to form a stable foam having a consistency between that of heavy cream and stiff whipped cream, pumping the foam under high pressure and spraying it into an atmosphere of heated gas to form dried porous particles of milk solid having a specific gravity between about 0.38 and 0.55, said particles having an average maximum dimension between about 300 to 500 microns.

7. A method of producing water soluble milk products comprising concentrating a liquid milk product to a moisture content between about 46% to 53%, introducing an inert gas into the concentrated milk, whipping and beating said milk and gas at superatmospheric pressure to form a stable foam having a consistency between that of heavy cream and stiff whipped cream, pumping the foam at a pressure between about 900 lbs. per square inch and 1,500 lbs. per square inch and spraying it into an atmosphere of heated gas to form dried porous particles of milk solid having a specific gravity between about 0.38 and 0.55, said particles having an average maximum dimension between about 300 and 500 microns.

References Cited in the file of this patent

UNITED STATES PATENTS

| | | |
|---|---|---|
| Re. 14,567 | Campbell | Dec. 17, 1918 |
| 1,250,427 | Campbell | Dec. 18, 1917 |
| 1,406,381 | Heath et al. | Feb. 14, 1922 |
| 1,506,732 | Benjamin | Sept. 2, 1924 |
| 2,788,276 | Reich | Apr. 9, 1957 |

FOREIGN PATENTS

| | | |
|---|---|---|
| 198,496 | Great Britain | June 7, 1923 |

OTHER REFERENCES

Sinnamon et al.: "Dry Whole Milk. I. A New Physical Form," J. Dairy Sci., vol. 40, September 1957, pages 1936–1945.